(12) United States Patent
Tu et al.

(10) Patent No.: US 11,748,114 B2
(45) Date of Patent: Sep. 5, 2023

(54) UNIVERSAL SERIAL BUS (USB) REDIRECTION FOR USB HUMAN INTERFACE DEVICE (HID) CLASS DEVICES

(71) Applicant: VMware, Inc., Palo Alto, CA (US)

(72) Inventors: Zhongzheng Tu, Beijing (CN); Joe Huiyong Huo, Beijing (CN); Mingsheng Zang, Beijing (CN); Jinxing Hu, Beijing (CN); Yueting Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 179 days.

(21) Appl. No.: 17/330,081

(22) Filed: May 25, 2021

(65) Prior Publication Data
US 2022/0382559 A1    Dec. 1, 2022

(51) Int. Cl.
| G06F 9/44 | (2018.01) |
| G06F 9/4401 | (2018.01) |
| G06F 9/455 | (2018.01) |
| G06F 9/48 | (2006.01) |
| G06F 13/38 | (2006.01) |
| G06F 13/42 | (2006.01) |

(52) U.S. Cl.
CPC .......... *G06F 9/4411* (2013.01); *G06F 9/4418* (2013.01); *G06F 9/45537* (2013.01); *G06F 9/4881* (2013.01); *G06F 13/382* (2013.01); *G06F 13/4282* (2013.01); *G06F 2213/0042* (2013.01)

(58) Field of Classification Search
CPC ..................................... G06F 9/4411
USPC ........................................ 719/328
See application file for complete search history.

(56) References Cited

U.S. PATENT DOCUMENTS

2017/0109301 A1 *   4/2017   Venkatesh ............... G06F 13/20

* cited by examiner

*Primary Examiner* — Timothy A Mudrick

(57) ABSTRACT

Techniques for implementing improved USB redirection of USB HID class devices are provided. In one set of embodiments a client system can receive, from a virtual desktop running on a server system, a poll message directed to an HID interface of a USB HID class device plugged into the client system and identify a polling thread associated with the HID interface. The client system can further save a copy of the poll message in the polling thread and initiate local polling of the HID interface, where the local polling comprises providing, via the polling thread, the copy of the poll message to the HID interface.

21 Claims, 9 Drawing Sheets

UNIVERSAL SERIAL BUS (USB) REDIRECTION FOR USB HUMAN INTERFACE DEVICE (HID) CLASS DEVICES

BACKGROUND

Unless otherwise indicated, the subject matter described in this section is not prior art to the claims of the present application and is not admitted as being prior art by inclusion in this section.

Virtual desktop infrastructure (VDI) is a technology that enables a user operating a client system to remotely access and interact with a desktop operating system (OS) instance running within a virtual machine (VM) on a server system. This server-side desktop OS instance is referred to as a virtual desktop.

USB redirection is a VDI platform feature that allows a user of a virtual desktop to plug Universal Serial Bus (USB) devices into his/her client system and access those USB devices from the virtual desktop as if they were physically connected there. The act of applying USB redirection to a USB device is referred to as "redirecting" the USB device (and the device itself is referred to as a "redirected" USB device) because the device's functionality is redirected, or in other words forwarded, from the client system to the virtual desktop.

While USB redirection works well for several use cases, the performance of redirected USB devices can vary greatly depending on network latency and reliability. This is particularly true for USB human interface device (HID) class devices such as signature pads, digital pens, and the like because USB HID class devices rely on a synchronized polling mechanism for data transfer and conventional USB redirection requires a network roundtrip between the server and client systems to be completed in each polling round (and before the next polling round can begin). If network latency is high, the polling rate of a redirected USB HID class device may be reduced to the point where its performance (in terms of accuracy and/or responsiveness) is significantly degraded, resulting in a poor end-user experience.

For example, consider a scenario in which a user turns on USB redirection for a client-side USB digital pen and attempts to draw a circle in his/her virtual desktop using the redirected pen. In this scenario, high network latency may cause the virtual desktop to receive input data indicative of a rectangle or some other unintended shape due to a reduced polling rate, thereby frustrating the user.

DETAILED DESCRIPTION

Figure 1:
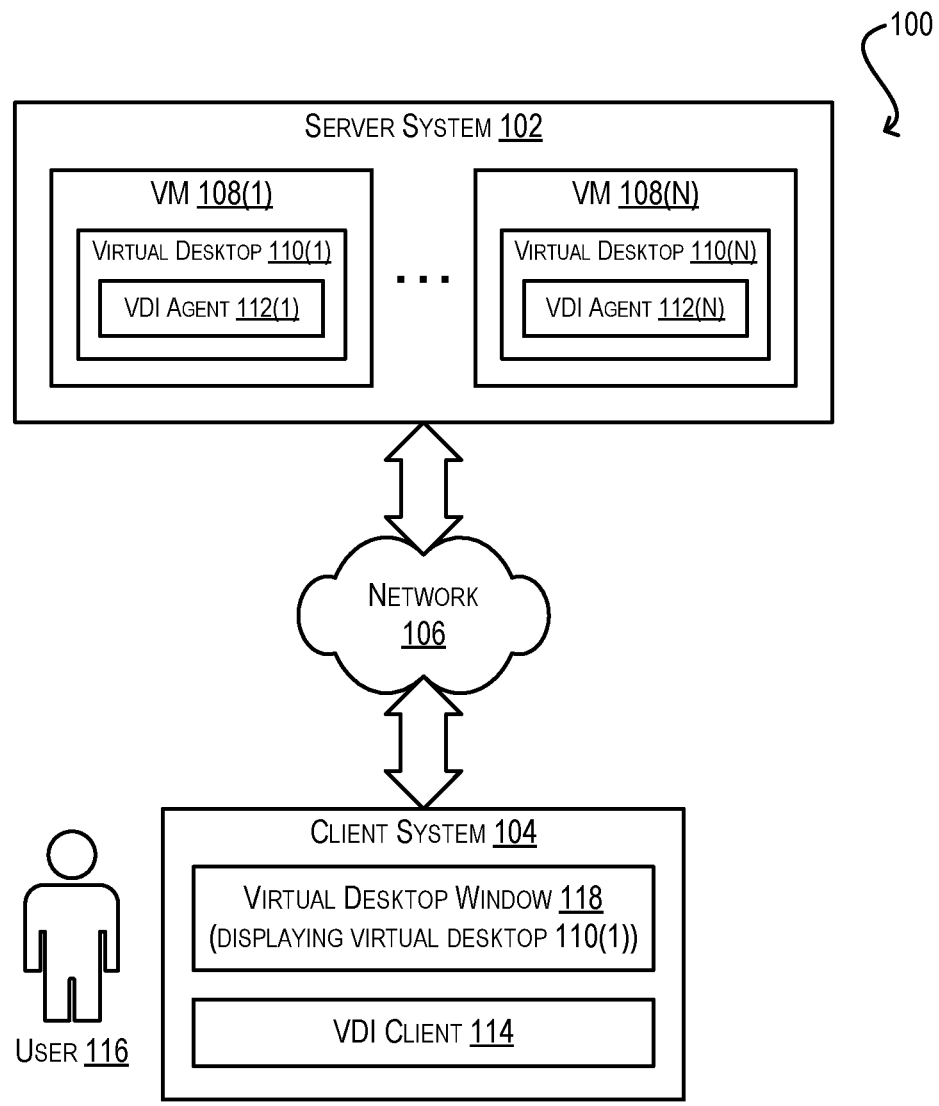
FIG. 1 depicts an example VDI environment.

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to an improved approach for redirecting USB HID class devices in a VDI environment. As used herein, a "USB HID class device," or "HID device" for short, is a USB peripheral device that enables human input/interaction and includes at least one HID interface (i.e., a logical device function conforming to the HID device class defined in the USB specification).

In one set of embodiments, a client system can receive an initial poll message from a server system, where the initial poll message is generated by a guest USB device driver of a VM on the server system and is directed to an HID interface of a USB HID class device plugged into the client system. Upon receiving the initial poll message, the client system can save a copy of it and begin local (i.e., client-side) polling of the HID interface using the saved poll message copy (rather than receiving and passing along further poll messages from the guest USB device driver). For each poll reply generated by the HID interface in response to this local polling, the client system can forward the poll reply to the server system.

In a further set of embodiments, a guest USB stack running within the VM on the server system can receive the poll replies forwarded by the client system and add them to a server-side queue associated with the HID interface of the USB HID class device. In addition, for each subsequent poll message generated by the guest USB device driver after the initial poll message, the guest USB stack can remove the first poll reply in the queue and provide the dequeued poll reply to the guest USB device driver (instead of forwarding the subsequent poll message to the client system).

With the general approach above, at the time of generating a poll reply for a poll message, the HID interface of the USB HID class device can immediately receive the next poll message via the client-side polling, without waiting for that next poll message to arrive over the network from the server system. Further, at the time of generating a subsequent poll message after the initial poll message, the guest USB device driver can immediately receive a poll reply via the server-side queue, without waiting for that poll reply to arrive over the network from the client system. Accordingly, this approach decouples the polling rate of the device's HID interface from the degree of network latency between the server and client systems, resulting in significantly improved device performance in high network latency environments. The foregoing and other aspects of the present disclosure are described in further detail below.

2. Example VDI Environment and Conventional USB Redirection

FIG. 1 is a simplified block diagram of an example VDI environment 100 comprising a server system 102 and a client system 104 that are communicatively coupled via a network 106. Client system 104 may be, e.g., a desktop computer, a laptop computer, a smartphone, a tablet, a thin client terminal, or the like. Network 106 may be, e.g., a local area network (LAN), a wide area network (WAN), the Internet, or some combination thereof. Although only a single server system and a single client system are shown for purposes of illustration, any number of these systems may be deployed within VDI environment 100.

Server system 102 includes a plurality of VMs 108(1)-(N), each running an instance of a desktop operating system (i.e., virtual desktop 110) such as Windows, Mac OS, Linux, or the like. Each virtual desktop 110 includes a VDI agent 112 that is configured to deliver virtual desktop 110 over network 106 to a user of a client system such as client system 104. For example, in FIG. 1, VDI agent 112(1) of VM 108(1) interoperates with a VDI client 114 running on client system 104 and thereby enables a user 116 of client system 104 to remotely access virtual desktop 110(1) via a client-side virtual desktop window 118. Through this client-side window (which presents a video stream of the graphical user interface (GUI) of virtual desktop 110(1)), user 116 can interact with virtual desktop 110(1) as if it were running locally on client system 104.

Figure 2:
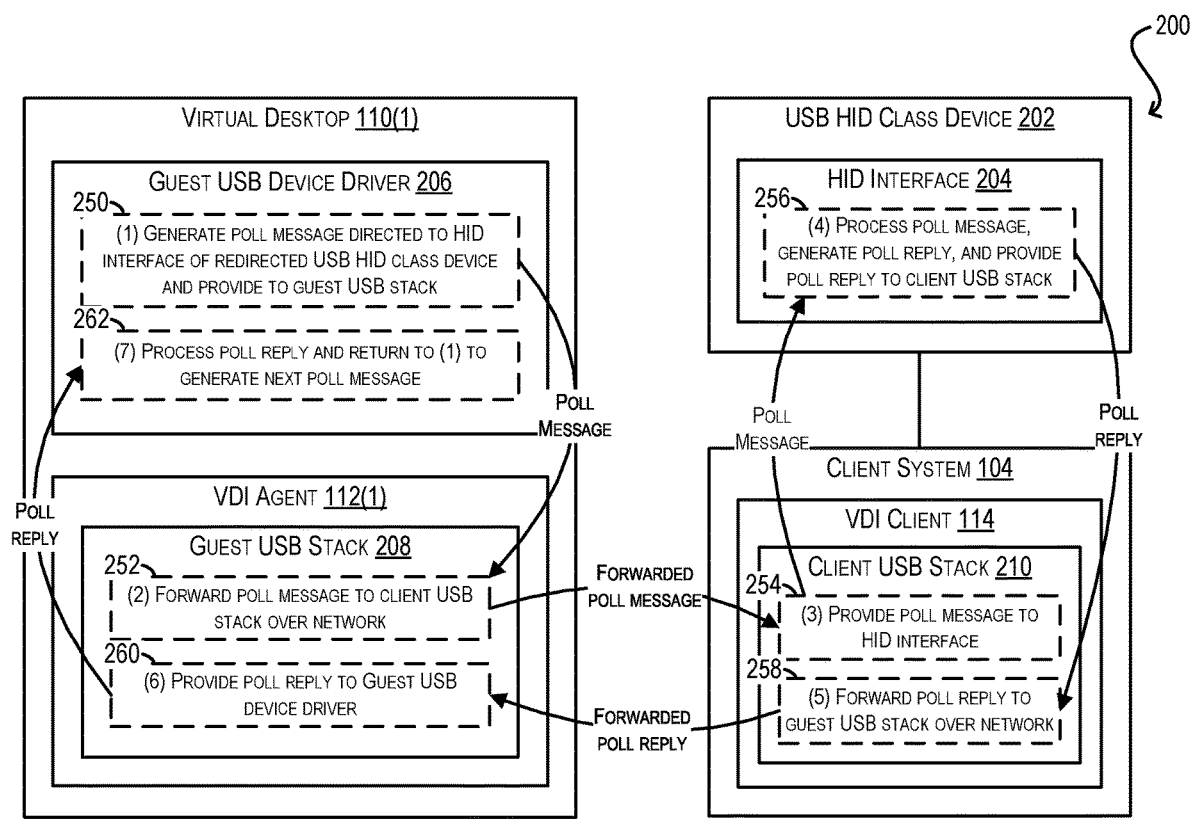
FIG. 2 depicts a conventional workflow for redirecting a USB HID class device.

FIG. 2 depicts a more detailed representation 200 of client system 104 and virtual desktop 110(1) of server system 102 in the scenario where user 116 has plugged a USB HID class device 202 into client system 104, as well as a workflow (comprising steps (1)-(7)) that may be executed by these entities for redirecting device 202 to virtual desktop 110(1) via conventional USB redirection. As shown, USB HID class device 202 includes an HID interface 204, which is a logical function of device 202 that conforms to the HID device class defined in the USB specification and communicates with USB hosts via USB HID protocol. In one set of embodiments USB HID class device 202 may be a "pure" HID device that solely includes an HID interface, such as a signature pad, digital stylus/pen, 3D mouse, etc. In other embodiments USB HID class device 202 may be a "composite" device that includes an HID interface and one or more other, non-HID interfaces. An example of a composite device is a game controller with a built-in speaker; such a game controller would typically include an HID interface for communicating controller inputs from the game controller to the USB host and an audio interface for communicating audio from the USB host to the game controller for playback via the speaker.

The workflow depicted in FIG. 2 specifically pertains to the "poll data" phase of the USB HID protocol that is carried out by HID interface 204 of USB HID class device 202 and its corresponding USB host (in this case, virtual desktop 110(1) of server system 102) to transfer data that is indicative of user inputs entered via device 202. It is assumed that USB HID class device 202 and virtual desktop 110(1) have already completed a "device setup" phase in which virtual desktop 110(1) determines the interfaces/capabilities of device 202—including a polling (i.e., "interrupt IN") endpoint and desired polling interval for HID interface 204—and configures device 202 to begin communication/operation via HID interface 204.

Starting with step (1) of workflow 200 (reference numeral 250), a guest USB device driver 206 within virtual desktop 110(1) generates a poll message (also known as an interrupt transfer request) that is directed to HID interface 204 of USB HID class device 202 (or more precisely, to the interrupt IN endpoint of HID interface 204) for the purpose of requesting input data entered by user 116 via his/her use of device 202. This poll message includes an identifier of the interrupt IN endpoint of HID interface 204 and other information that will typically be identical for every poll message directed to that endpoint. Upon generating the poll message, guest USB device driver 206 provides it to a guest USB stack 208 of VDI agent 112(1).

At step (2) (reference numeral 252), guest USB stack 208 forwards the poll message over network 106 to a client USB stack 210 of VDI client 114 on client system 104. Client USB stack 210 then provides the poll message (via, e.g., a client-side USB host controller that is not shown) to the interrupt IN endpoint of HID interface 204 (step (3); reference numeral 254).

At step (4) (reference numeral 256), HID interface 204 processes the poll message, generates a responsive poll reply (also known as an HID report), and provides the poll reply to client USB stack 210. This poll reply includes, e.g., input data (or a change in input data) collected/received by USB HID class device 202 from user 116 since the generation of the last poll reply. For example, if USB HID class device 202 is a digital pen, the poll reply may include a relative x and y position of the pen.

Client USB stack 210 thereafter forwards the poll reply over network 106 to guest USB stack 208 of VDI agent 112(1) (step (5); reference numeral 258), and guest USB stack 208 provides the poll reply to guest USB device driver 206 (step (6); reference numeral 260).

Finally, at step (7) (reference numeral 262), guest USB device driver 206 processes the poll reply (e.g., makes it available to a guest application within virtual desktop 110(1) accessing USB HID class device 202) and returns to step (1) in order to generate a next poll message for HID interface 204 (once the current polling interval has expired).

As noted in the Background section, one issue with the conventional USB redirection workflow shown in FIG. 2 is that each polling round between guest USB device driver 206 and HID interface 204 of USB HID class device 202 requires a network roundtrip between server system 102 and client system 104 and this network roundtrip must be completed before the next polling round can begin. If the network latency in VDI environment 100 is high (which will typically be the case if network 106 is a WAN or the Internet), the polling rate of—and thus data throughput to/from—HID interface 204 will be significantly reduced.

Figure 3A:
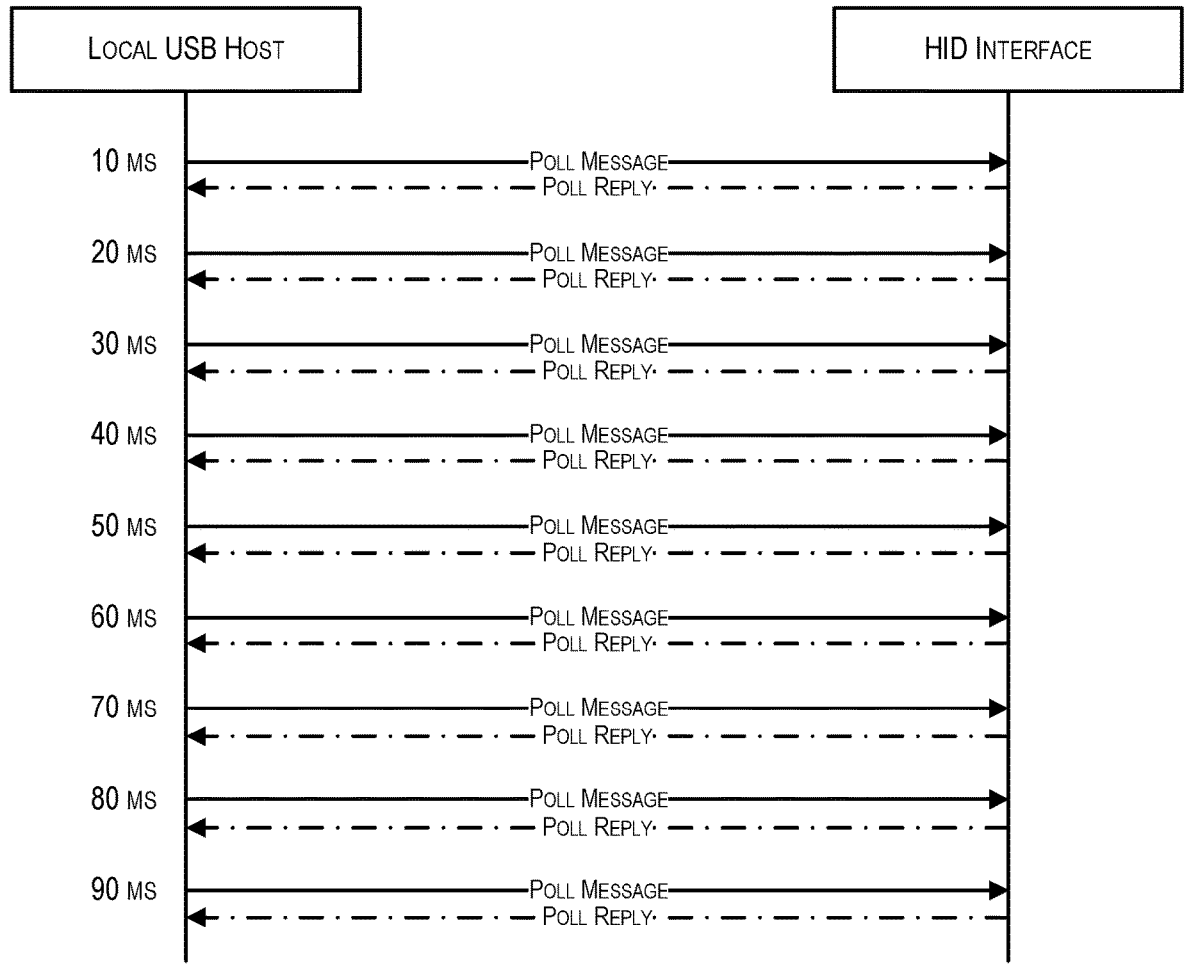
FIGS. 3A and 3B depict example polling rate scenarios.
Figure 3B:
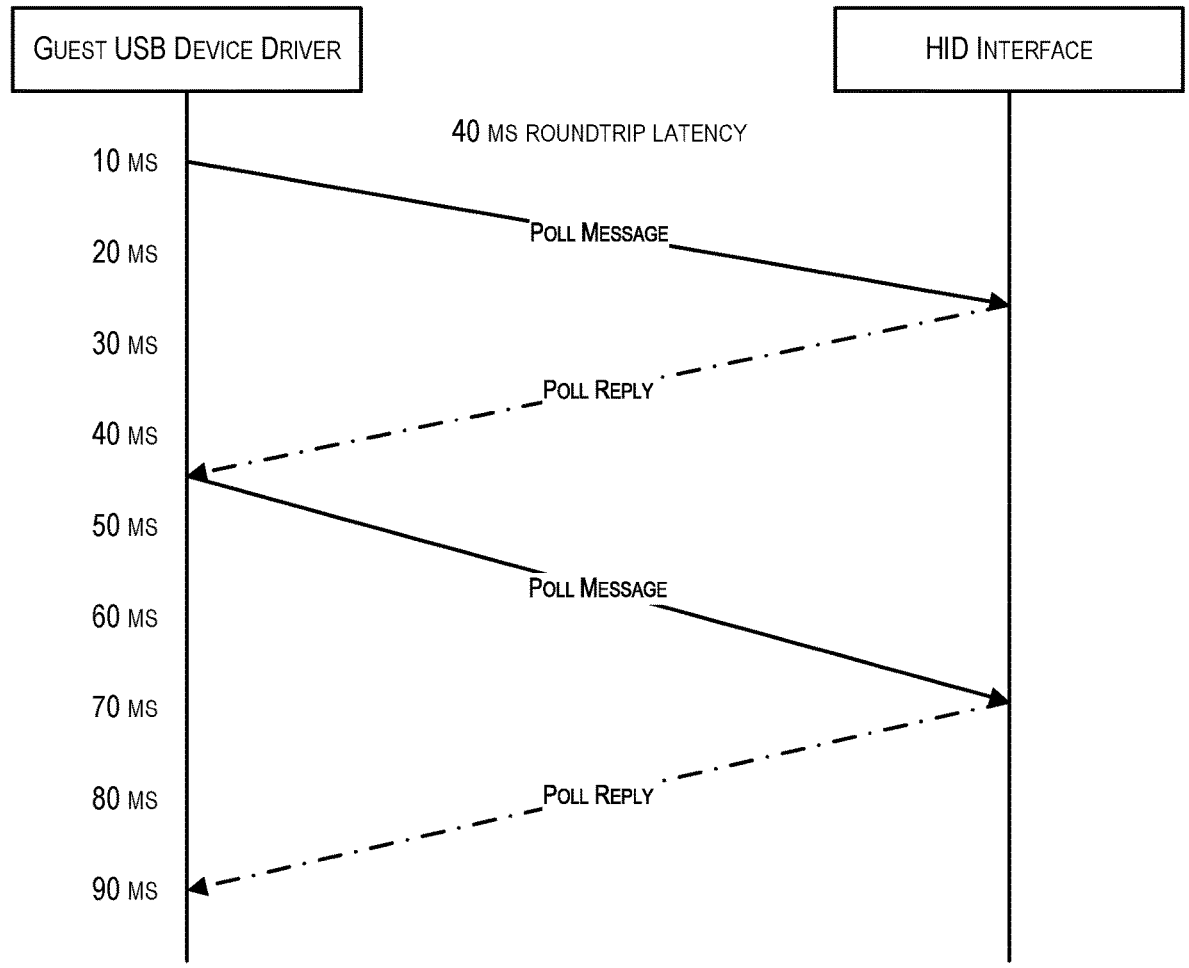

For example, FIG. 3A illustrates an example sequence of polling rounds between HID interface 204 of USB HID class device 202 and a local USB host in a "native" (i.e., non-redirected) scenario, and FIG. 3B illustrates an example sequence of polling rounds between HID interface 204 and guest USB device driver 206 in the conventional USB redirection scenario of FIG. 2 (with 40 milliseconds (ms) of roundtrip network latency). As shown in FIG. 3A, due to the minimal latency between HID interface 204 and the USB host, each polling round (i.e., transmission of a poll message and receipt of a corresponding poll reply) is completed within 10 ms, resulting in a polling rate 100 hertz (Hz). In contrast, in FIG. 3B, due to the 40 ms of roundtrip network latency between HID interface 204 and guest USB device driver 206, each polling round takes at least 40 ms to complete, resulting in a polling rate of only 25 Hz. For many types of USB HID class devices, such a reduction in polling rate can decrease the device's accuracy and responsiveness, making it more difficult to use.

3. Solution Description

Figure 4:
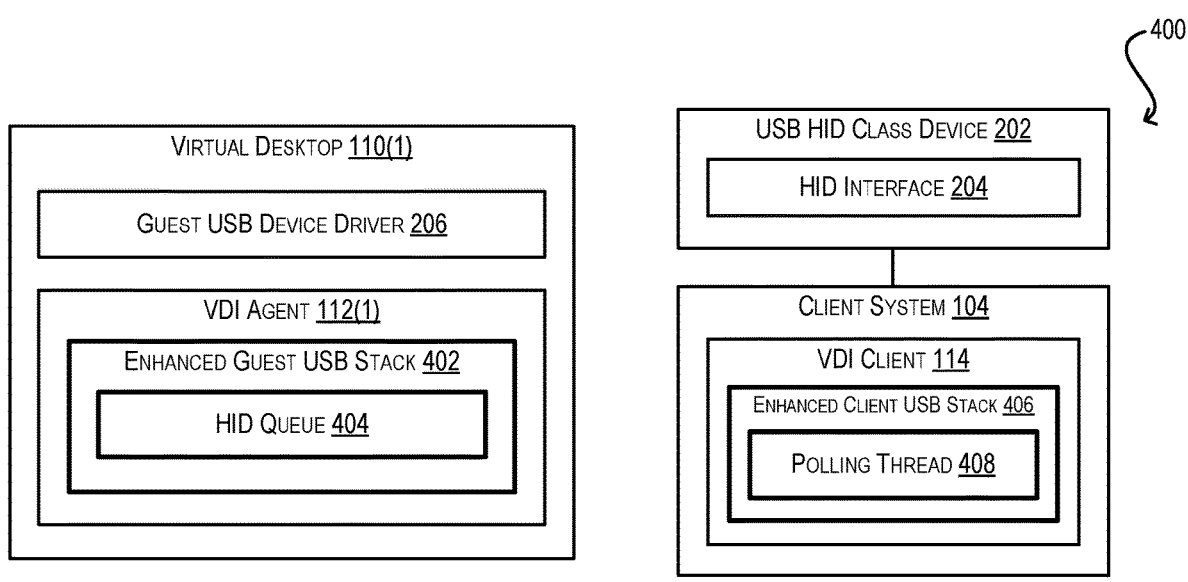
FIGS. 4 and 5 depict enhanced/new components and an improved workflow for redirecting a USB HID class device according to certain embodiments.
Figure 5:
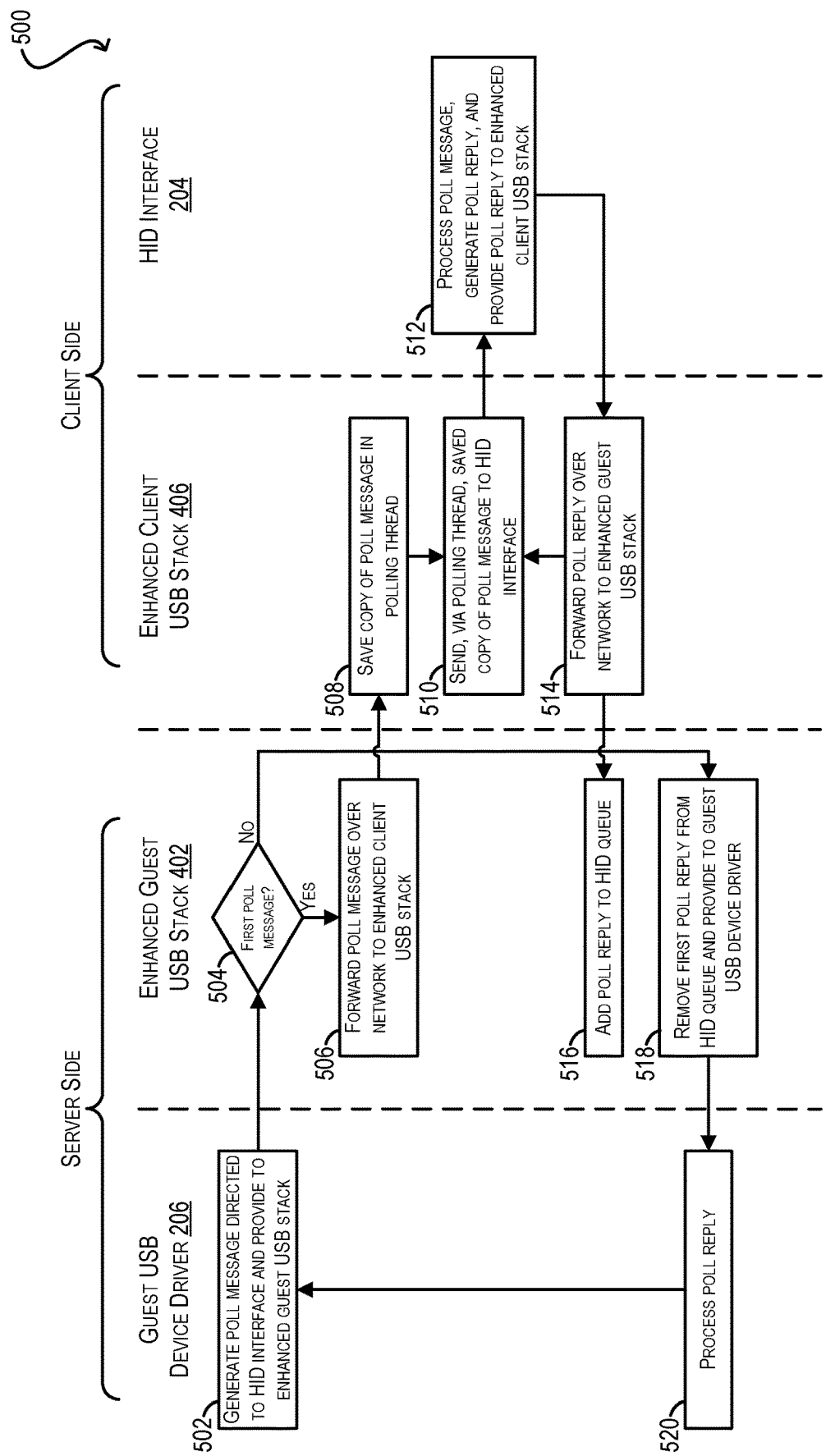

To address the foregoing and other similar issues, FIG. 4 depicts a modified representation 400 of the entities shown in FIG. 2 that includes an enhanced guest USB stack 402 with a novel HID queue 404 in virtual desktop 110(1) and an enhanced client USB stack 406 with a novel polling thread 408 in client system 104. In addition, FIG. 5 depicts an improved USB redirection workflow 500 that can be executed via these enhanced/new components in accordance with certain embodiments. Improved USB redirection workflow 500 leverages the fact that every poll message generated by guest USB device driver 206 and directed to HID interface 204 of USB HID class device 202 contains largely the same information (and thus does not need to be forwarded from server system 102 to client system 104 over network 106 at each polling round).

Starting with block 502 of workflow 500, guest USB device driver 206 can generate a poll message (i.e., interrupt transfer request) directed to the interrupt IN endpoint of HID interface 204 and provide the poll message to enhanced guest USB stack 402. As with step (1) of the workflow of FIG. 2, this poll message can include, among other things, an identifier of the interrupt IN endpoint.

At block 504, enhanced guest USB stack 402 can check whether the received poll message is the first (i.e., initial) poll message directed to the interrupt IN endpoint of HID interface 204. If the answer is yes, enhanced guest USB stack 402 can forward the poll message over network 106 to enhanced client USB stack 406 of client system 104 (block 506).

At block 508, enhanced client USB stack 406 can save a copy of the poll message in polling thread 408 (which is associated with the interrupt IN endpoint of HID interface 204). Polling thread 408 can then initiate local (i.e., client-side polling) of HID interface 204 by providing the saved copy of the poll message to the interface's interrupt IN endpoint (block 510).

In response, HID interface 204 can process the received poll message, generate a poll reply (i.e., HID report), and provide the poll reply to enhanced client USB stack 406. Enhanced client USB stack 406 can thereafter forward the poll reply over network 106 to enhanced guest USB stack 402 of server system 102 (block 514), and client-side processing can return to block 510 so that polling thread 408 can once again locally poll HID interface 204 using the saved poll response copy (upon expiration of the current polling interval).

In addition, at block 516, enhanced guest USB stack 402 can receive the poll reply from enhanced client USB stack 406 and add the poll reply to HID queue 404 (which is associated with the interrupt IN endpoint of HID interface 204).

Returning now to block 504, if the poll message received from guest USB device driver 206 is not the first poll message, enhanced guest USB stack 402 can remove (i.e., dequeue) the first poll reply present in HID queue 404 and provide this dequeued poll reply to guest USB device driver 206 (block 518). Guest USB device driver 206 can then process the poll reply received from enhanced guest USB stack 402 (block 520) and return to block 502 in order to generate a next poll message for HID interface 204 (upon expiration of the current polling interval).

With this improved USB redirection approach, a number of advantages are realized over the conventional approach shown in FIG. 2. First, because client-side polling thread 408 polls HID interface 204 locally using the saved copy of the initial poll message received from enhanced guest USB stack 402 (rather than waiting for and passing along a new poll message from enhanced guest USB stack 402 in each polling round), the polling rate of HID interface 204 is not affected by the amount of network latency between server system 102 and client system 104. Instead, HID interface 204 can be polled as quickly as in a non-redirected scenario. Thus, the end-user perceived performance of USB HID class device 202 can remain high in the face of poor network connectivity/response time between the server and client systems (with the only tradeoff being some input lag due to the need for poll replies to traverse from client system 104 to server system 102).

Second, because enhanced guest USB stack 402 does not forward any poll messages beyond the first poll message for HID interface 204 to enhanced client USB stack 406, the improved approach reduces network bandwidth usage in the downstream (i.e., server-to-client) direction. This makes more network bandwidth available for other purposes, which can be important in bandwidth constrained situations. In some embodiments, the data transmitted over network 106 can be compressed to further reduce network bandwidth usage.

Third, the improved approach is specific to HID interfaces and thus will not affect the way in which non-HID interfaces are redirected (which may not be suited to using this approach). For example, if USB HID class device 202 is a composite device that includes a non-HID interface in addition to HID interface 204, the improved approach can be applied to HID interface 204 and a separate, conventional USB redirection approach can be applied to the non-HID interface.

The remaining sections of this disclosure provide additional information regarding the processing attributed to virtual desktop 110 and client system 104 in FIGS. 4 and 5, as well as certain other implementation details and optimizations. It should be appreciated that FIG. 4 and FIG. 5 are illustrative and not intended to limit embodiments of the present disclosure. For example, FIGS. 4 and 5 depict a single HID queue 404 in enhanced guest USB stack 402 and a single polling thread 408 in enhanced client USB stack 406 because the scenario contemplated in in these figures pertains to the redirection of a single HID interface (i.e., HID interface 204). In alternative scenarios where multiple HID interfaces (either within a single USB device or across multiple devices) are redirected, multiple HID queues and polling threads will be present (one HID queue/polling thread per redirected HID interface).

Further, although FIGS. 4 and 5 depict a particular arrangement of components within virtual desktop 110 and client system 104, other arrangements are possible (e.g., the functionality attributed to a particular component may be split into multiple components, components may be combined, etc.). One of ordinary skill in the art will recognize other variations, modifications, and alternatives.

4. HID Queue and Polling Thread Creation

Figure 6:
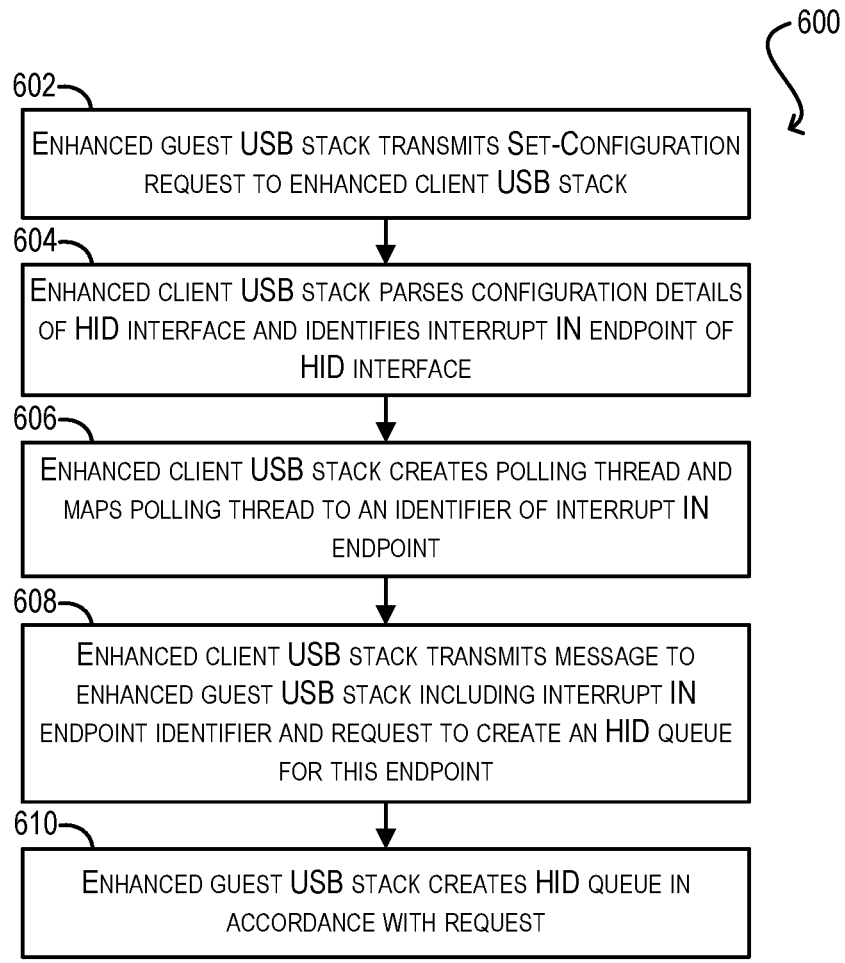
FIG. 6 depicts a flowchart for creating an HID queue and a polling thread according to certain embodiments.

FIG. 6 depicts a flowchart 600 that can be performed by enhanced guest USB stack 402 and enhanced client USB stack 406 for creating HID queue 404 and polling thread 408, prior to the execution of the improved redirection (i.e., poll data phase) workflow shown in FIG. 5 according to certain embodiments. In a particular embodiment, flowchart 600 may be performed as part of the device setup phase of USB HID class device 202 at the time device 202 is connected to virtual desktop 110.

At block 602, enhanced guest USB stack 402 can transmit a "Set-Configuration" request to enhanced client USB stack 406 for configuring USB HID class device 202 to operate using HID interface 204.

At block 604, enhanced client USB stack 406 can parse the configuration details of HID interface 204 and identify the interrupt IN endpoint of this HID interface. Enhanced client USB stack 406 can then create polling thread 408 and map polling thread 408 to an identifier of the interrupt IN endpoint (also known as an interrupt pipe) (block 606).

Upon completing these steps, enhanced client USB stack 408 can transmit a message to enhanced guest USB stack 402 including the interrupt IN endpoint identifier and a request to create an HID queue for this endpoint (block 608). Finally, at block 610, enhanced guest USB stack 402 can create HID queue 404 in accordance with the received request and workflow 600 can end.

5. Client-Side Poll Data Operation

Figure 7:
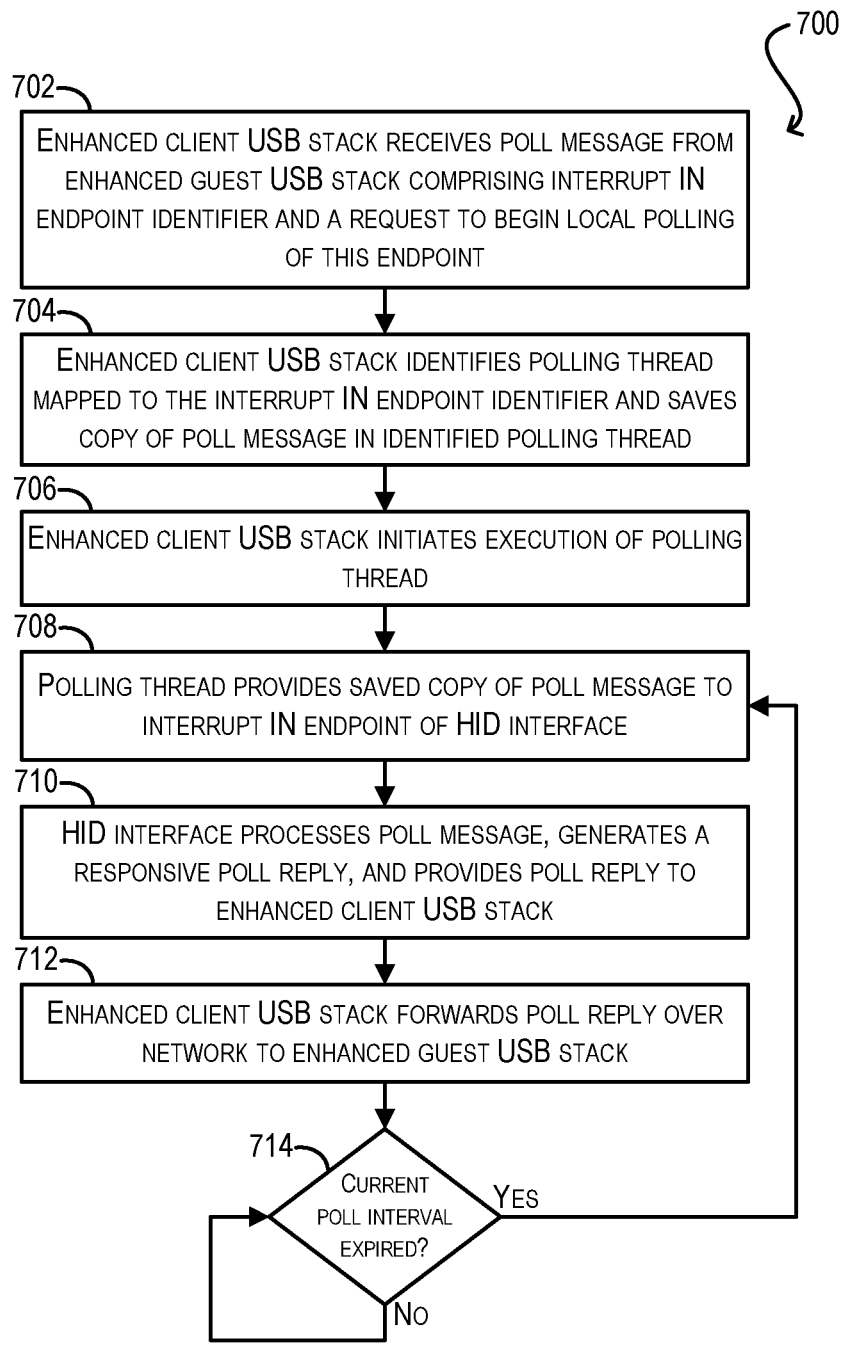
FIG. 7 depicts a flowchart that provides additional details regarding the client-side processing performed in the workflow of FIG. 5 according to certain embodiments.

FIG. 7 depicts a flowchart 700 that provides additional details regarding the processing performed by the components of client system 104 (e.g., enhanced client USB stack 406 and polling thread 408) as part of improved redirection workflow 500 of FIG. 5 according to certain embodiments.

Starting with block 702, enhanced client USB stack 406 can receive a poll message from enhanced guest USB stack 402 that includes the interrupt IN endpoint identifier of HID interface 204, along with a request to begin local (i.e., client-side) polling of this endpoint.

At block 704, enhanced client USB stack 406 can identify the polling thread created for the interrupt IN endpoint during the device setup phase (per flowchart 600 of FIG. 6) and save a copy of the poll message in that polling thread. Enhanced client USB stack 406 can then initiate execution of polling thread 408 (block 706), which causes the polling thread to provide the saved poll message copy to the interrupt IN endpoint of HID interface 204 (block 708).

At block 710, HID interface 204 can process the received poll message, generate a poll reply, and provide the poll reply via the interrupt IN endpoint to enhanced client USB stack 406. In response, enhanced client USB stack 406 can forward the poll reply over network 106 to enhanced guest USB stack 402 of server system 102 (block 712).

Finally, polling thread 408 can check whether the current polling interval for HID interface 204 has expired (block 714). If the answer is no, polling thread 408 can continue checking for its expiration; otherwise, polling thread 408 can return to block 708 to begin the next local polling round.

6. Server-Side Poll Data Operation

Figure 8:
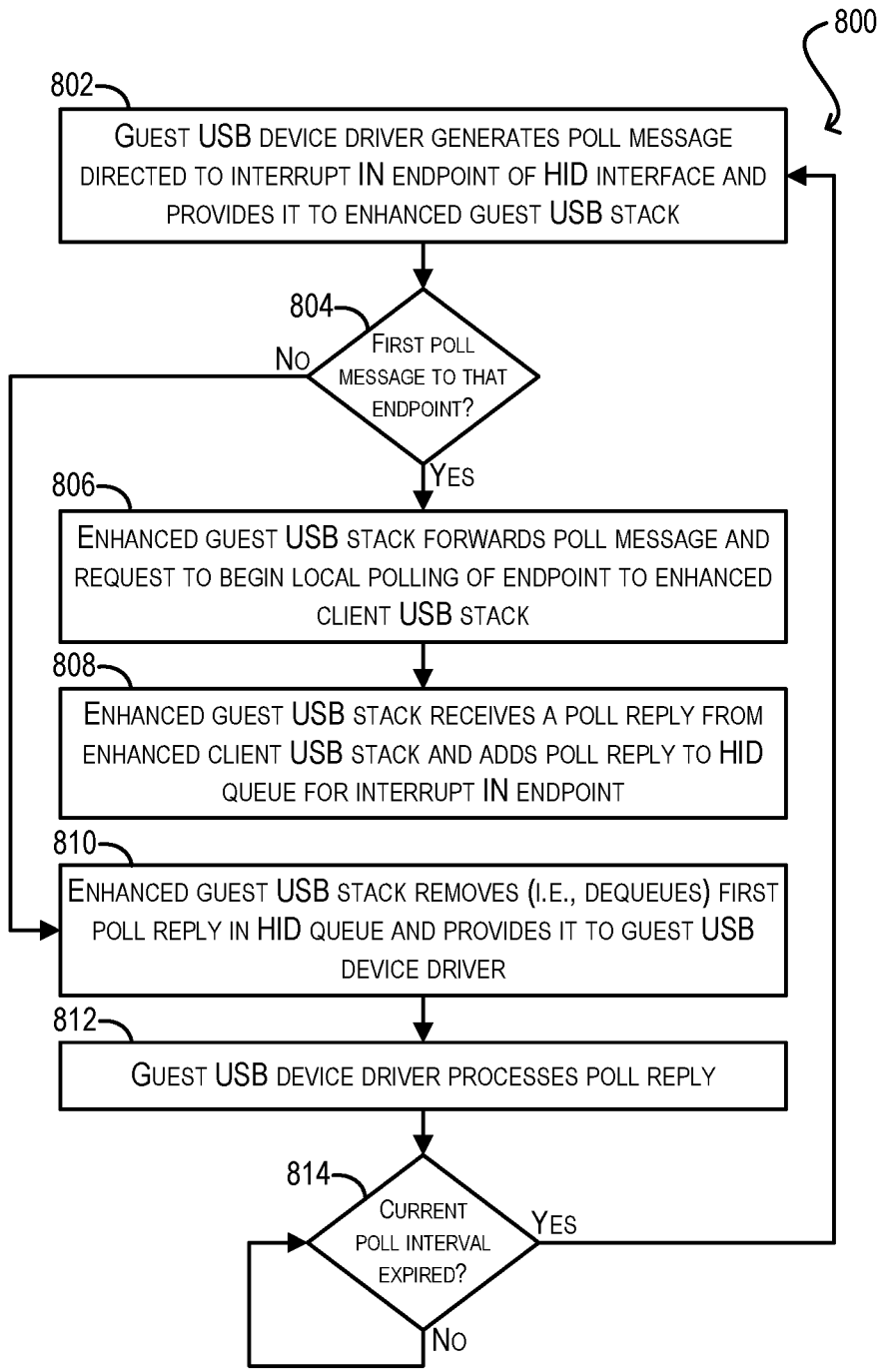
FIG. 8 depicts a flowchart that provides additional details regarding the server-side processing performed in the workflow of FIG. 5 according to certain embodiments.

FIG. 8 depicts a flowchart 800 that provides additional details regarding the processing performed by the components of virtual desktop 110(1) of server system 102 (e.g., guest USB device driver 206 and enhanced guest USB stack 402) as part of improved redirection workflow 500 of FIG. 5 according to certain embodiments.

Starting with block 802, guest USB device driver 206 can generate a poll message directed to the interrupt IN endpoint of HID interface 204 and provide it to enhanced guest USB stack 402.

At block 804, enhanced guest USB stack 402 can check whether the received poll message is the first poll message directed to this endpoint. If the answer is yes, enhanced guest USB stack 402 can forward the poll message, along with a request to begin client-side polling on this endpoint, over network 106 to enhanced client USB stack 406 of client system 104 (block 806). In addition, enhanced guest USB stack 402 can receive, from enhanced client USB stack 406, a poll reply originating from HID interface 204 and can add the poll reply to an HID queue mapped to the interrupt IN endpoint of that HID interface (i.e., HID queue 404) (block 808).

However, if the answer at block 804 is no (i.e., the poll message received from guest USB device driver is not the first poll message directed to the interrupt IN endpoint of HID interface 204), enhanced guest USB stack 402 can remove the first poll reply in HID queue 404 and provide the dequeued poll reply to guest USB device driver 206 (block 810).

Finally, at blocks 812 and 814, guest USB device driver 206 can process the poll reply and check whether the current polling interval for HID interface 204 has expired. If the answer is no, guest USB device driver 206 can continue checking for its expiration; otherwise, guest USB device driver 206 can return to block 802 to begin the next server-side polling round.

7. Pausing and Restarting Client-Side Polling

In certain embodiments, if enhanced guest USB stack 402 detects that HID queue 404 has become inactive, enhanced guest USB stack 402 can send a notification to enhanced client USB stack 406 to pause the client-side polling of HID interface 204. HID queue 404 may become inactive if, e.g., redirected HID device 202 is disabled in virtual desktop 110(1). In response to this notification, enhanced client USB stack 406 can suspend execution of polling thread 408.

Once HID queue 404 becomes active again, enhanced guest USB stack 402 can send another notification to enhanced client USB stack 406 to restart the client-side polling of HID interface 204. In response to this second notification, enhanced client USB stack 406 can resume execution of polling thread 408.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method for redirecting a Universal Serial Bus (USB) human interface device (HID) class device from a client system to a virtual desktop running on a server system, the method comprising:
   receiving, by the client system from the virtual desktop, a poll message directed to an HID interface of the USB HID class device;
   identifying, by the client system, a polling thread associated with the HID interface;
   saving, by the client system, a copy of the poll message in the polling thread; and
   initiating, by the client system, local polling of the HID interface, the local polling comprising providing, via the polling thread, the copy of the poll message to the HID interface.

2. The method of claim 1 further comprising:
   receiving, by the client system, a poll reply from the HID interface in response to the copy of the poll message;
   forwarding, by the client system, the poll reply to the virtual desktop; and
   continuing, via the polling thread, the local polling of the HID interface by providing the copy of the poll message to the HID interface on a periodic basis.

3. The method of claim 2 wherein upon receiving the poll reply, the virtual desktop adds the poll reply to a queue in the virtual desktop that is associated with the HID interface.

4. The method of claim 3 wherein the poll message is generated by a guest USB device driver in the virtual desktop, and wherein a guest USB stack in the virtual desktop checks, before sending the poll message to the client system, whether the poll message is a first poll message generated by the guest USB device driver for the HID interface.

5. The method of claim 4 wherein if the poll message is not the first poll message generated by the guest USB device driver for the HID interface, the guest USB stack dequeues a first poll reply in the queue and provides the first poll reply to the guest USB device driver.

6. The method of claim 5 wherein upon receiving the first poll reply from the guest USB stack, the guest USB device driver processes the first poll reply and generates a next poll message directed to the HID interface.

7. The method of claim 1 further comprising:
   receiving, by the client system, a notification from the virtual desktop to pause the local polling of the HID interface; and
   in response to the notification, suspending execution of the polling thread.

8. A non-transitory computer readable storage medium having stored thereon program code executable by a client system, the program code embodying a method for redirecting a Universal Serial Bus (USB) human interface device (HID) class device from the client system to a virtual desktop running on a server system, the method comprising:
   receiving, from the virtual desktop, a poll message directed to an HID interface of the USB HID class device;
   identifying a polling thread associated with the HID interface;
   saving a copy of the poll message in the polling thread; and
   initiating local polling of the HID interface, the local polling comprising providing, via the polling thread, the copy of the poll message to the HID interface.

9. The non-transitory computer readable storage medium of claim 8 wherein the method further comprises:
   receiving a poll reply from the HID interface in response to the copy of the poll message;
   forwarding the poll reply to the virtual desktop; and
   continuing, via the polling thread, the local polling of the HID interface by providing the copy of the poll message to the HID interface on a periodic basis.

10. The non-transitory computer readable storage medium of claim 9 wherein upon receiving the poll reply, the virtual desktop adds the poll reply to a queue in the virtual desktop that is associated with the HID interface.

11. The non-transitory computer readable storage medium of claim 10 wherein the poll message is generated by a guest USB device driver in the virtual desktop, and wherein a guest USB stack in the virtual desktop checks, before sending the poll message to the client system, whether the poll message is a first poll message generated by the guest USB device driver for the HID interface.

12. The non-transitory computer readable storage medium of claim 11 wherein if the poll message is not the first poll message generated by the guest USB device driver for the HID interface, the guest USB stack dequeues a first poll reply in the queue and provides the first poll reply to the guest USB device driver.

13. The non-transitory computer readable storage medium of claim 12 wherein upon receiving the first poll reply from the guest USB stack, the guest USB device driver processes the first poll reply and generates a next poll message directed to the HID interface.

14. The non-transitory computer readable storage medium of claim 8 wherein the method further comprises:
receiving a notification from the virtual desktop to pause the local polling of the HID interface; and
in response to the notification, suspending execution of the polling thread.

15. A client system comprising:
a processor; and
a non-transitory computer readable medium having stored thereon program code for redirecting a Universal Serial Bus (USB) human interface device (HID) class device from the client system to a virtual desktop running on a server system, the program code causing the processor to:
receive, from the virtual desktop, a poll message directed to an HID interface of the USB HID class device;
identify a polling thread associated with the HID interface;
save a copy of the poll message in the polling thread; and
initiate local polling of the HID interface, the local polling comprising providing, via the polling thread, the copy of the poll message to the HID interface.

16. The client system of claim 15 wherein the program code further causes the processor to:

receive a poll reply from the HID interface in response to the copy of the poll message;
forward the poll reply to the virtual desktop; and
continue, via the polling thread, the local polling of the HID interface by providing the copy of the poll message to the HID interface on a periodic basis.

17. The client system of claim 16 wherein upon receiving the poll reply, the virtual desktop adds the poll reply to a queue in the virtual desktop that is associated with the HID interface.

18. The client system of claim 17 wherein the poll message is generated by a guest USB device driver in the virtual desktop, and wherein a guest USB stack in the virtual desktop checks, before sending the poll message to the client system, whether the poll message is a first poll message generated by the guest USB device driver for the HID interface.

19. The client system of claim 18 wherein if the poll message is not the first poll message generated by the guest USB device driver for the HID interface, the guest USB stack dequeues a first poll reply in the queue and provides the first poll reply to the guest USB device driver.

20. The client system of claim 19 wherein upon receiving the first poll reply from the guest USB stack, the guest USB device driver processes the first poll reply and generates a next poll message directed to the HID interface.

21. The client system of claim 15 wherein the program code further causes the processor to:
receive a notification from the virtual desktop to pause the local polling of the HID interface; and
in response to the notification, suspend execution of the polling thread.

\* \* \* \* \*